(12) United States Patent
Grell et al.

(10) Patent No.: US 8,386,848 B2
(45) Date of Patent: Feb. 26, 2013

(54) ROOT CAUSE ANALYSIS FOR COMPLEX EVENT PROCESSING

(75) Inventors: Stephan Grell, Munich (DE); Olivier Nano, Aachen (DE)

(73) Assignee: Microsoft Corporation, Redmond, WA (US)

( * ) Notice: Subject to any disclaimer, the term of this patent is extended or adjusted under 35 U.S.C. 154(b) by 356 days.

(21) Appl. No.: 12/463,506

(22) Filed: May 11, 2009

(65) Prior Publication Data

US 2010/0287361 A1 Nov. 11, 2010

(51) Int. Cl.
G06F 11/00 (2006.01)

(52) U.S. Cl. .......................................... 714/25

(58) Field of Classification Search ................ 714/25; 712/233, 220
See application file for complete search history.

(56) References Cited

U.S. PATENT DOCUMENTS

| | | | | |
|---|---|---|---|---|
| 5,566,092 | A * | 10/1996 | Wang et al. | 702/185 |
| 7,251,584 | B1 * | 7/2007 | Perazolo et al. | 702/183 |
| 7,379,846 | B1 * | 5/2008 | Williams et al. | 702/185 |
| 7,873,998 | B1 * | 1/2011 | Wilkinson et al. | 726/22 |
| 2005/0096759 | A1 * | 5/2005 | Benjamin et al. | 700/62 |
| 2005/0210331 | A1 * | 9/2005 | Connelly et al. | 714/26 |
| 2007/0043861 | A1 * | 2/2007 | Baron et al. | 709/224 |
| 2007/0255529 | A1 | 11/2007 | Biazetti et al. | |
| 2009/0049345 | A1 * | 2/2009 | Mock et al. | 714/57 |
| 2009/0113248 | A1 * | 4/2009 | Bock et al. | 714/39 |
| 2010/0100775 | A1 * | 4/2010 | Slutsman et al. | 714/47 |

OTHER PUBLICATIONS

"ActiveVOS", retrieved on Apr. 13, 2009 at <<http://www.activevos.com/products-activevos.php>>, Business Process Management (BPM), Composite Applications and Service Orchestrations, 4 pages.
Barth, et al., "Complex Event Processing at Orbitz", retrieved on Apr. 13, 2009 at <<http://developers.sun.com/learning/javaoneonline/j1sessn.jsp?sessn=TS-6048&yr=2008&track=coolstuff>>, Sun Microsystems, Inc., 1994-2009, 2 pages.
"Complex Event Processing Tutorial", retrieved on Apr. 13, 2009 at <<http://www.eventstreamprocessing.com/CEP-tutorial.htm>>, 2 pages.
Etzion, "Event Processing Thinking", retrieved on Apr. 13, 2009 at <<http://epthinking.blogspot.com/2009/03/on-misconceptions-and-fun-in-event.html>>, Mar. 11, 2009, 8 pages.
Grell, et al, "Experimenting with Complex Event Processing for Large Scale Internet Services Monitoring", retrieved on Apr. 9, 2009 at <<http://icep-fis08.fzi.de/papers/iCEP08_1.pdf>>, Microsoft, Germany, 10 pages.

(Continued)

*Primary Examiner* — Scott Baderman
*Assistant Examiner* — Yair Leibovich
(74) *Attorney, Agent, or Firm* — Zete Law, P.L.L.C.; MacLane C. Key

(57) ABSTRACT

Root cause analysis for complex event processing is described. In embodiments, root cause analysis at a complex event processor is automatically performed by selecting an output event from an operator and correlating the output event to an input event using event type and lifetime data for the input event and the output event stored in a data store. Embodiments describe how the lifetime data can comprise a start time and an end time for the event, and the correlation can be based on a comparison of the start and end times between the input and output events. Embodiments describe how the correlation algorithm used is selected in dependence on the event type. In embodiments, a complex event processing engine comprises a logging unit arranged to store in the data store an indicator of an event type and lifetime data for each output event from an operator.

20 Claims, 16 Drawing Sheets

OTHER PUBLICATIONS

Pickering, et al., "Model-driven Management of Complex Systems", retrieved on Apr. 9, 2009 at <<http://www.comp.lancs.ac.uk/~bencomo/MRT/papers/MRT08_manuscript3.pdf>>, 10 pages.

"Progress Software Extends Event Processing Market Leadship with Introduction of Apama? 3.0", retrieved on Apr. 13, 2009 at <<http://www.automatedtrader.net/algo-trading-news-229.xhtm>>, Automated Trader Ltd, 2009, 2 pages.

Suntinger, et al., "The Event Tunnel: Interactive Visualization of Complex Event Streams for Business Process Pattern Analysis", retrieved on Apr. 9, 2009 at <<http://ieeexplore.ieee.org/stamp/stamp.jsp?arnumber=04475466>>, IEEE Pacific Visualization Symposium Mar. 4-7, 2008, Japan, pp. 111-118.

\* cited by examiner

ROOT CAUSE ANALYSIS FOR COMPLEX EVENT PROCESSING

BACKGROUND

Complex event processing is a method of computing that performs operations on complex events. Typical examples of complex event processing include server management, risk management, supply chain and retail operation automations, airline operations management, fraud detection, and infrastructure monitoring. The goal of complex event processing is to derive or infer significant output events from a large number of input events, using patterns or relationships that can exist between these input events. A complex event is an event which is an abstraction of other events. Operations performed on the events in a complex event processor can include (but are not limited to) reading, creating, transforming or abstracting the events.

Complex event processing involves monitoring many sources of event data. An event is anything that happens in a monitored system, such as a CPU load, a sensor output, a keystroke, a financial trade or any other detectable action. These source events are then analyzed in terms of key performance indicators that are expressed in terms of event rules or operators. These source events are then acted on in real-time by creating a continuous output of complex events.

However, it is generally difficult to understand from the output of a complex event processor which specific source input events contributed to the output. For example, in the case of a web-based email service which operates using a large number of servers, a complex event processor can receive information from each of the servers regarding their status (e.g. CPU load, storage space) and the number of emails they are processing. The complex event processor can analyze these source events and determine if the performance of the email service is falling. Whilst this can provide a rapid notification of a decline in the service, it does not readily indicate which particular server or group of servers are causing the decline, nor what the fault is.

Root cause analysis is a method of taking an output from a process and attempting to define the original source inputs (i.e. the root causes) that gave rise to the investigated event. To apply root cause analysis to a complex event processor, a record of all source events, outputs, and preferably all intermediate events need to be accessible to the root cause analysis. Therefore every event needs to be stored by the complex event processor along with information linking it to its preceding events. Since complex event processing engines can typically handle tens of thousands of events per second this leads to the utilization of a very large amount of storage space. Storing all these events also results in performance overheads at the complex event processing engine. Furthermore, many of these stored events are never even used, as they are not relevant to the root cause analysis.

In addition, the construction and understanding of the root cause analysis requires navigation of large amounts of data which has to be manually analyzed by a user. In particular, the user has to manually analyze and filter the data to find the events which contributed to a particular output.

The embodiments described below are not limited to implementations which solve any or all of the disadvantages of known complex event processors.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Root cause analysis for complex event processing is described. In embodiments, root cause analysis at a complex event processor is automatically performed by selecting an output event from an operator and correlating the output event to an input event using event type and lifetime data for the input event and the output event stored in a data store. Embodiments describe how the lifetime data can comprise a start time and an end time for the event, and the correlation can be based on a comparison of the start and end times between the input and output events. Embodiments describe how the correlation algorithm used is selected in dependence on the event type. In embodiments, a complex event processing engine comprises a logging unit arranged to store in the data store an indicator of an event type and lifetime data for each output event from an operator.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a complex event processing system, the system described is provided as an example and not a limitation. As those skilled in the art will appreciate, the present examples are suitable for application in a variety of different types of processing systems.

Figure 1:
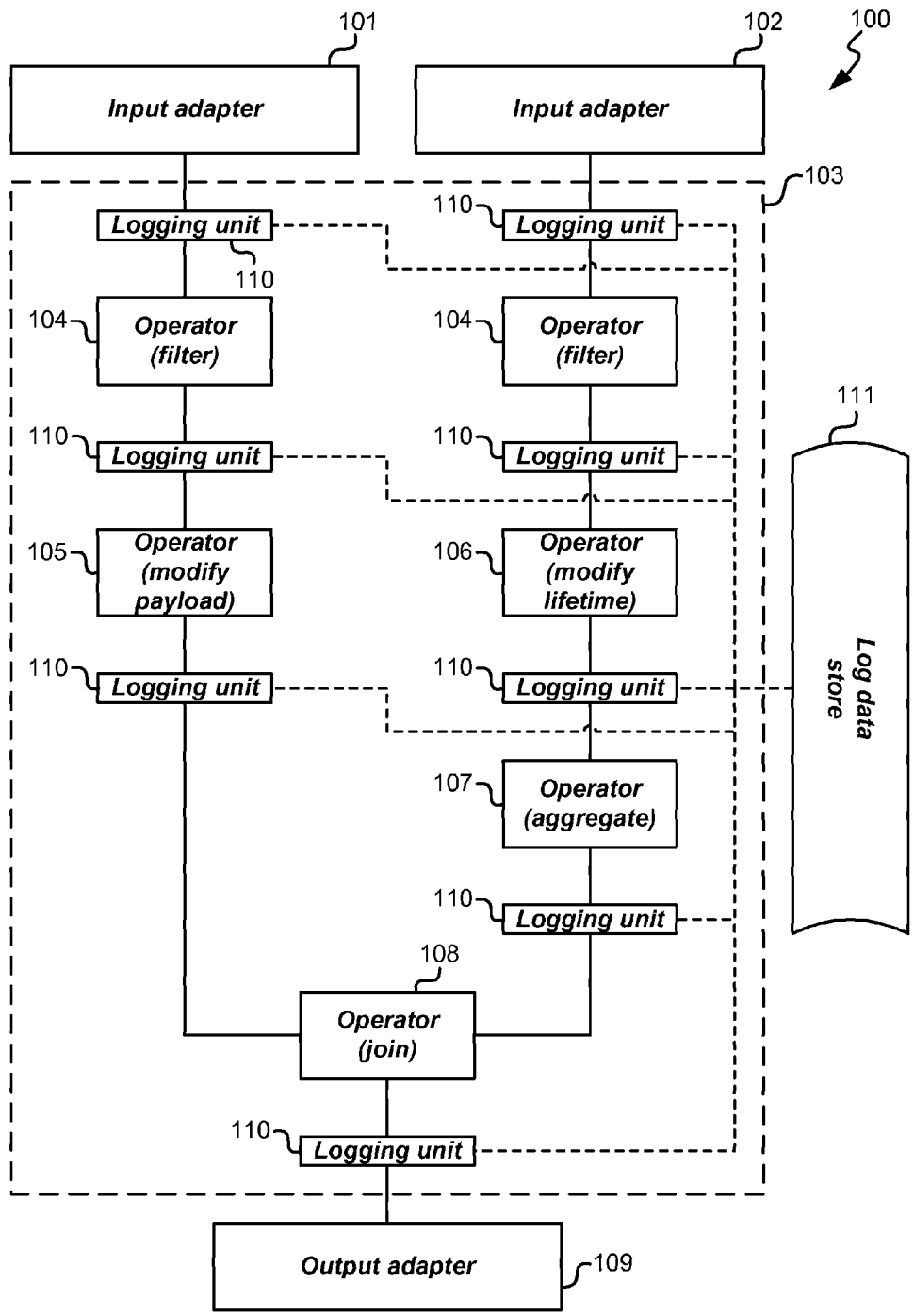
FIG. 1 illustrates a complex event processing engine.

FIG. 1 illustrates a complex event processing engine 100 which can be used with an automated root cause analysis technique. In the following description, events that are input to the complex event processing engine (e.g. from a sensor in a monitored system) are called "source events" and events output from the complex event processing engine are called "derived events".

Two input adapters 101 and 102 are shown. In other examples, there can be only one, or more than two input adapters. Each input adapter 101, 102 is arranged to receive and handle source events of a different type. Events from the input adapters 101, 102 are processed and transformed by a processing block 103 to generate the derived events.

The processing block 103 comprises a plurality of operators arranged to perform one or more operations on the events as they pass through the processing block 103. The processing block 103 can have any number of operators. The operators can be "modification operators" which modify events (such as filters, payload modifiers, or lifetime modifiers) or "new event operators" which create new events (such as joiners, summers or aggregators). In the illustrative example shown in FIG. 1, the processing block 103 comprises filter operators 104, a payload modifier 105, a lifetime modifier 106, an aggregate operator 107 and a join operator 108. The operators are arranged in order to perform operations such that the derived events are provided from one or more output adapters 109 (only one output adapter is shown in FIG. 1).

A plurality of logging units 110 are provided at the output of each of the operators and input adapters. The logging units 110 are arranged to record the events that pass through them in the processing block 103. The logged events are stored in a log data store 111. The data that is stored by the logging units 110 is discussed in more detail hereinafter.

In operation, source events arrive at the input adapters 101 and 102 (potentially from a large number of sources), such that one particular type of event is provided to one input adapter, and another type of event is provided to another input adapter. The input adapters 101 and 102 can transform the events if required before they are processed further. The events are processed by the operators in the processing block 103 and data about the events is logged in the log data store 111 at each stage by the logging units 110. Once the events have been processed, a derived event is provided from the output adapter 109 (which can also transform the event if required, before outputting). The derived event provides a meaningful analysis of the input events, and allows the user of the complex event processing engine 100 to make inferences about the monitored system.

For example, in the case of a web-based email service which operates using a large number of servers, the complex event processing engine of FIG. 1 can receive information from each of the servers at input adapter 101 regarding their CPU load, and receive information from each of the servers at input adapter 102 regarding the number of emails they are processing. The processing block 103 performs operations to analyze these source events and can be arranged to provide a derived event from the output adapter 109 if the performance of the email service is declining.

As mentioned above, it is difficult for the user to know from a derived event which a specific source event (or source events) gave rise to the derived event. Root cause analysis (RCA) can be performed in order to determine the original source inputs (or root causes) that resulted in the derived event. However, this involves the storage of a record of every event along with information linking it to its preceding events. Due to the very large number of events that are processed by a complex event processing engine, this leads to the utilization of a very large amount of storage space and a significant performance overhead.

However, the amount of data that is stored for each event can be significantly reduced by performing analysis on the events during the root cause analysis in order to automatically reconstruct the interrelationships between the events, thereby avoiding the need for such data to be stored during the complex event processing.

In order to achieve the reduction in the storage requirements for the events, for each event only certain data is logged by the logging units 110. The data that is logged is carefully selected to ensure that the interrelationships between the events can still be reconstructed when performing the root cause analysis. In one example, the data that is stored for each event by the logging units 110 comprises an event lifetime, an identity of the operator which produced the event, a log time, payload data, and an event type. The event lifetime data defines the temporal duration over which the event is applicable. In other examples, the logged data can also comprise a unique event identifier, which is generated by the logging units.

The lifetime data can comprise at least one of a start time for the event, an end time for the event, and a modified end time for the event. The modified end time is used in the case that an operator changes the end time for the event. The log time is the time at which the data is logged by the logging unit 110. The payload data is a message that is contained within the event.

The event type defines a classification for the event. For example, three different event types can be distinguished. A first event type is an insert event, which is a normal, new event entering the complex event processing engine. A second event type is an update event, which is a correction of a previously added event, and which can modify parameters such as the lifetime or payload. A third type of event is a concurrent time increment (CTI), which is used as a time-marker. A CTI event is used because events can arrive at the system out of order, and the CTI events indicates to the system that previous events can be reordered.

When a derived output event of interest is received at one of the output adapters a root cause analysis can be performed using the above-mentioned logged data in order to reconstruct the earlier source event(s) causing the derived event. The method of root cause analysis used in this example is known as fault tree analysis (although other methods of root cause analysis can also be used). In fault tree analysis the starting point is an initial derived event, received at the output adapter 109. A fault tree is then constructed showing all source events that are related to the derived event and how they are related. The fault tree can then be analyzed to find the source events at the input adapters 101, 102 which created the selected derived events.

Figure 2:
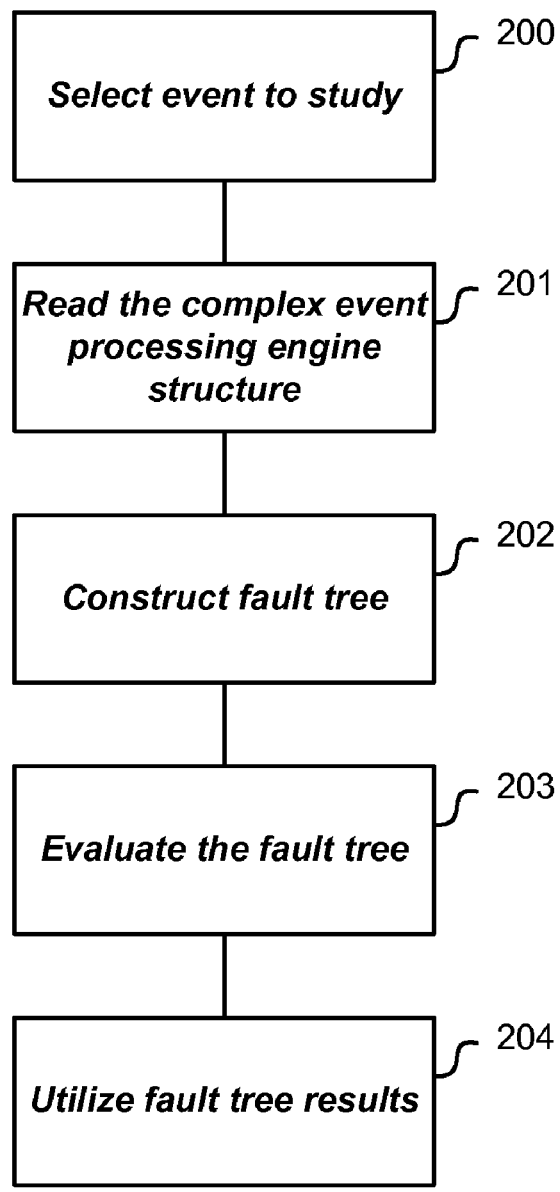
FIG. 2 illustrates a process for performing root cause analysis on a complex event processing engine.

FIG. 2 illustrates a process for performing root cause analysis on a complex event processing engine and utilizing the results thereof. Firstly, a derived event is selected 200 to be analyzed. For example, if a derived event is output from the complex event processor indicating a drop in the performance of an email service, then this can serve as the event to be studied. The root cause analysis algorithm then reads 201 the structure of the processing block 103. Specifically, the root cause analysis algorithm interprets the structure of the processing block 103 in order to determine how the operators are interconnected, and ultimately how the input and output adapters are connected via the operators in the complex event processing engine 100.

A fault tree analysis is then performed in order to construct 202 a fault tree, which links events together, starting from the selected derived event until one or more source events are reached. The process for performing the construction of the fault tree is described in more detail with reference to FIG. 3 hereinafter. Once the fault tree has been constructed, it can be evaluated 203 to consider the source events that gave rise to the derived event. The results of the evaluation can then be utilized 204 to benefit the user and the future operation of the complex event processing engine.

Figure 3:
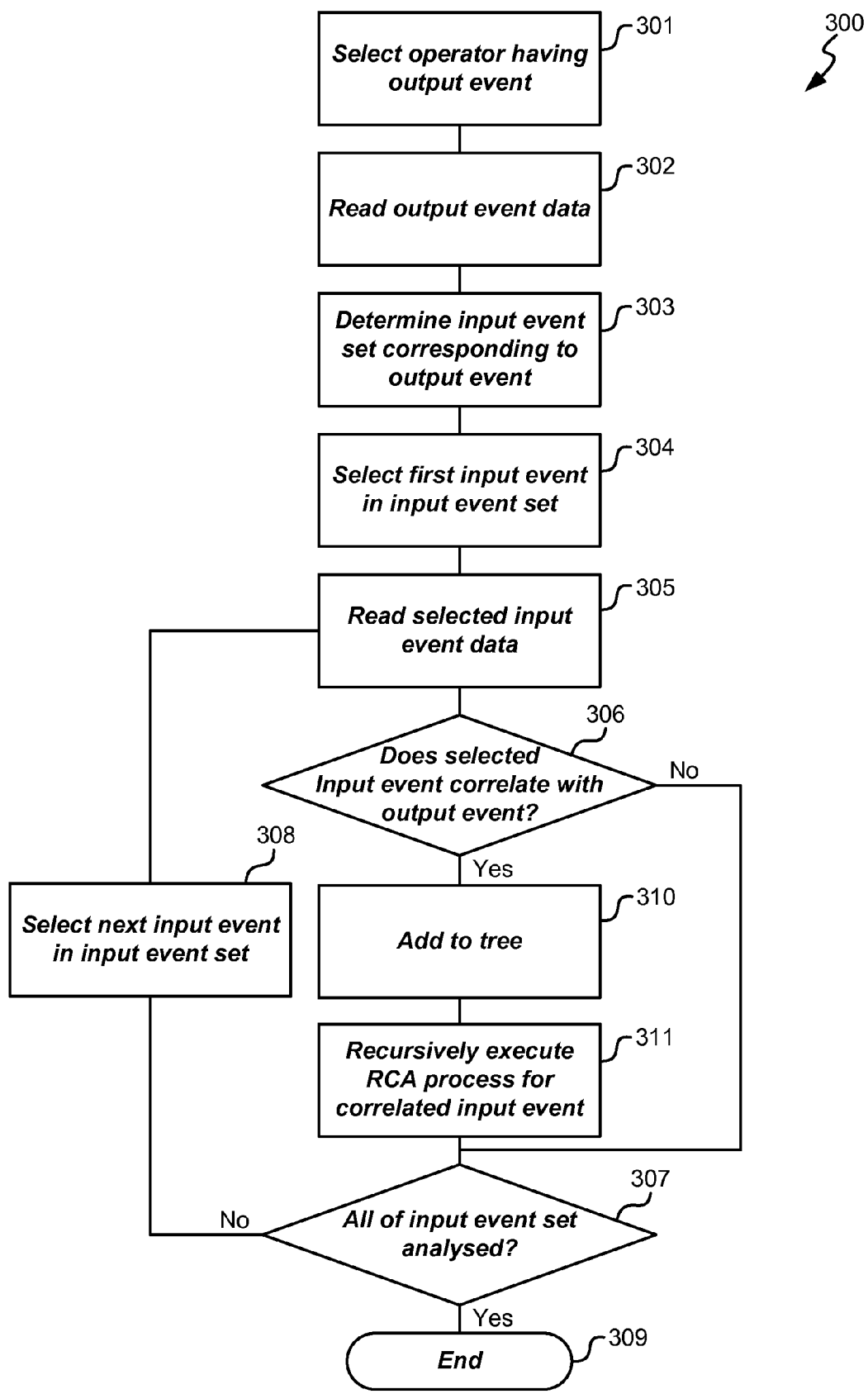
FIG. 3 illustrates a process for constructing a fault tree.

Reference is now made to FIG. 3, which illustrates a process for performing root cause analysis in the complex event processing engine. The root cause analysis process 300 works backwards from the output adapter 109, through each operator in the processing block 103 in turn, until the input adapters 101, 102 are reached. The root cause analysis process 300 looks at a single operator at a time, and looks at the output event from that operator, and determines which input event(s) to that operator are related to that output event. Note that, in the description below, "output event" refers to the event that is output from the individual operator that the root cause analysis algorithm is currently focused on. Similarly, "input event" refers to an event that is input to the individual operator that the root cause analysis algorithm is currently focused on. This is not to be confused with "source event", which are the events provided to the input adapters, and "derived event", which is the events produced from the output adapters.

The root cause analysis process 300 starts with the derived event that is being analyzed. The root cause analysis process 300 first selects 301 the operator in the processing block 103 having the derived event as an output event. The RCA process 300 uses the known structure of the complex event processing engine 100 to select the operator that generated the output event. In the example of FIG. 1, the RCA process moves back from the output adapter 109 to the join operator 108.

The log data store 111 is then accessed, and the data stored therein for the output event from the selected operator is read 302. This comprises the selected data stored by the logging unit as described above.

The RCA process 300 then determines 302 a set of one or more events that were input to this selected operator. In the example of FIG. 1, the RCA process determines all the events that were input to the join operator 108. The first event in the set of events input to the operator is selected 304, and the RCA process 300 then accesses the log data store 111 and reads 305 the stored log data for the selected input event to the operator in question.

The RCA process 300 determines 306 whether the selected input event correlates with (i.e. had at least a part in causing) the output event at the operator. The determination of the correlation is performed using the stored log data for the selected input event and the output event. Therefore, the presence of an interrelationship between the input event and the output event is determined by the use of the correlation process and the stored log data, without the requirement to store information explicitly detailing the interrelationship.

To perform the correlation process, a comparison is carried out between the input event and the output event. This comparison is based on a number of items of data relating to both the input and output events that were read from the log data store 111. One example is to compare the events according to the time information stored for each event. Another example is to compare the payload of each event. Another example is to compare the event identifier of each event. Other data can also be compared. The event type of the events can be used to select a particular correlation process to use, as described in more detail hereinafter. A detailed description of the correlation process is provided with reference to FIG. 4-15, once the description of FIG. 3 is complete.

If the RCA process 300 determines 306 that there is not a correlation between the first input event in the input event set and the output event, then it is checked 307 whether further input events in the input event set remain to be analyzed. If so, then the next event in the input event set is selected 308, and the correlation performed for this event. If not, then the RCA process 300 ends 309.

If, however, the RCA process 300 determines 306 that there is a correlation between the event input to the operator in question and the output event, then the input event is added 310 to a tree data structure. The tree data structure is a data structure that stores all the events that the RCA process 300 determines are related to the derived event being investigated, and also stores the relationships between the events. The derived event being investigated is at the root of the tree, and each level below that in the tree corresponds to events determined to relate to the events in the levels above. Ultimately, the leaf nodes of the tree correspond to source events, thereby providing the overall relationship between the source events and the derived event being investigated.

Once the event has been added 310 to the tree, the RCA process 300 is recursively executed such that the correlated input event now becomes the output event for the next execution of the RCA process 300. In other words, the RCA process 300 performed again, but this time the next operator back in the complex event processing engine is selected (i.e. the operator having as an output the event which was the correlated input event in the previous execution). For example, in the case of FIG. 1, the join operator 108 has one input event which is an output event from the aggregate operator 107. If this input event at the join operator 108 is found to be correlated to the output event of the join operator 108, then the recursive execution of the RCA process 300 is such that the RCA process 300 moves to the aggregate operator 107. The output event for this execution of the RCA process is the output of the aggregate operator 107 (which in the previous execution was the input to the join operator 108).

The recursion of the RCA process 300 thus continues until all inputs from all operators have been considered. Note that when an RCA process 300 ends 309, then entire process does not terminate. Rather, only the instance of the process in execution at that point ends. The process then steps into the previous execution and continues from there.

The RCA process 300 can be summarized with the pseudo-code below:

```
RootCauseAnalysis(event)
{
  operator = OperatorFor(event);
  eventData = ReadEventData(event);
  inputEventSet = DetermineInputEvents(operator);
  for each inputEvent in inputEventSet
  {
    inputEventData = ReadEventData(inputEvent);
    if Correlation(eventData, inputEventData) = true
```

```
    {
      AddToTree(inputEvent);
      RootCauseAnalysis(inputEvent);
    }
  }
}
```

The overall RootCauseAnalysis function has as an argument an event. For the first execution of the function, the argument is the derived event under investigation. Subsequent (recursive) executions of the function will have different events as the argument. The function selects the operator for the event, reads the data related to the event, and determines the set of input events for the operator, as outlined above. Then, for each of the input events to the operator (i.e. each of the input events in the input event set), it is determined if the input event is correlated to the argument of the RootCauseAnalysis function. If so, then the input event is added to the tree, and the function then calls itself, with the correlated input event as the input to the function.

Figure 4:
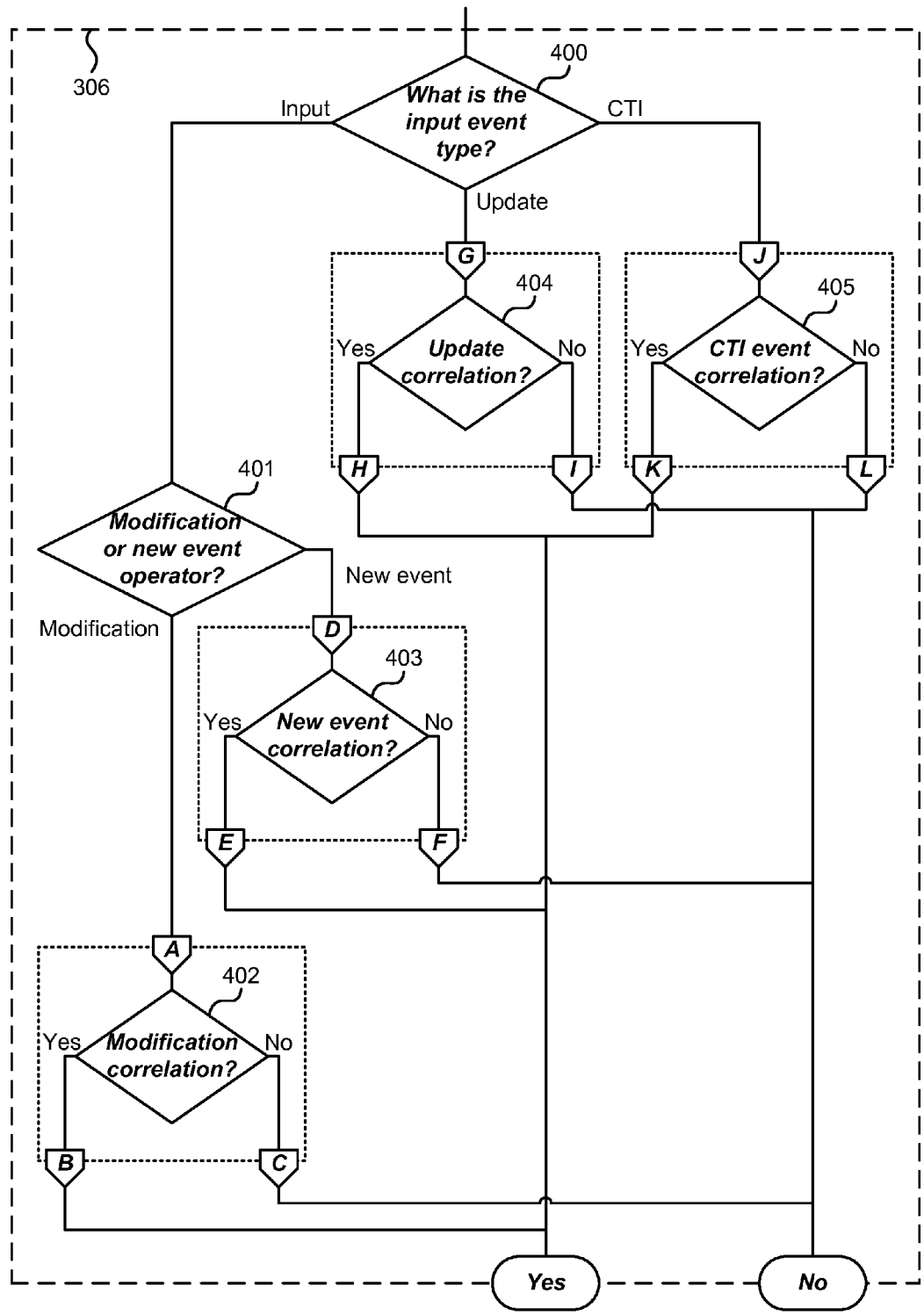
FIG. 4 illustrates a process for determining whether an input event correlates with an output event.

Reference is now made to FIG. 4, which illustrates the process by which the RCA process 300 determines 306 whether an input event correlates with an output event at an operator, as mentioned above with reference to FIG. 3. The process shown in FIG. 4 is used to select particular correlation algorithms to use for particular types of events.

The input event type is firstly determined 400 from the log data related to the input event (as read 305 in FIG. 3). As described above, the events in this example are classified as belonging to one of three types: an insert event; an update event; or a CTI event.

If it is determined 400 that the input event is of the insert event type, then the operator identity is used to determine 401 whether the operator outputting the output event is a modification operator or a new event operator. If it is determined that the operator is a modification operator, then a modification correlation algorithm 402 is used to determine whether or not the output event is correlated with the input event in question.

Figure 5:
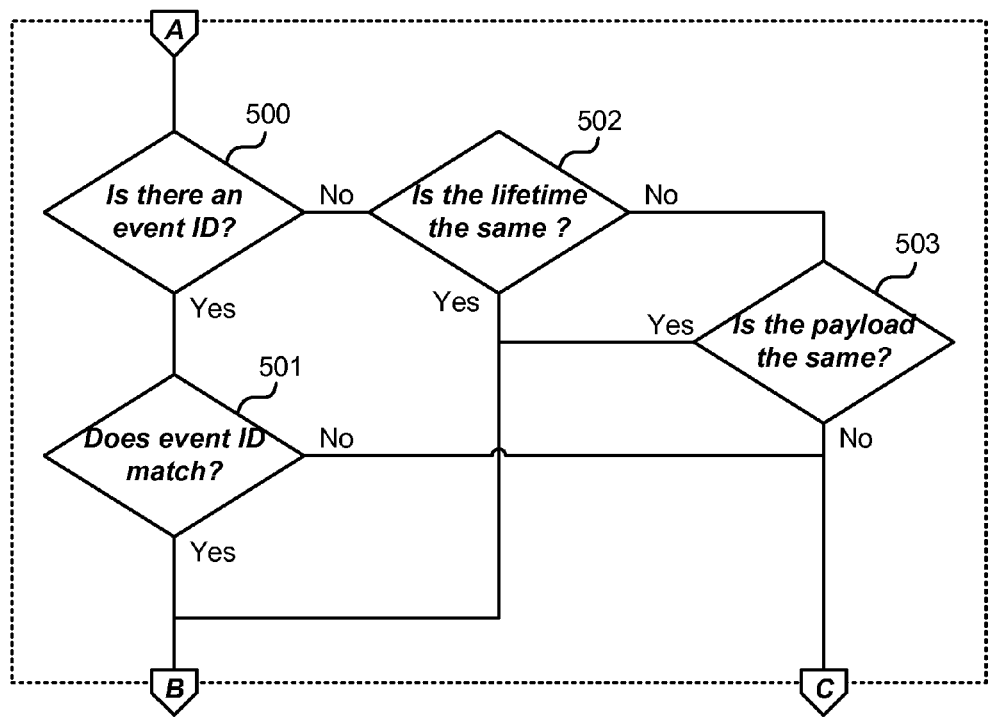
FIG. 5 illustrates a modification correlation algorithm.

A modification correlation algorithm is illustrated in FIG. 5. To determine whether an input event is correlated to the output in the case of an insert event and a modification operator, it is first determined 500 whether an event identifier exists for the input and output events (this was mentioned as optional log data to store, hereinabove). If this is present, then it is determined 501 whether the event identifiers for the input and output events match. If so, then the input and output events are correlated. If they do not match, then the input and output events are not correlated.

If it was determined 500 that an event identifier was not present for the input and/or output event, then the lifetime data for the input and output events are compared 502. If the lifetime data matches, then the input and output events are correlated. If the lifetime data does not match, then the payloads of the input and output events are compared 503. If the payloads do not match, then the input and output events are not correlated, whereas if the payloads do match, then the input and output events are correlated.

Figure 6:
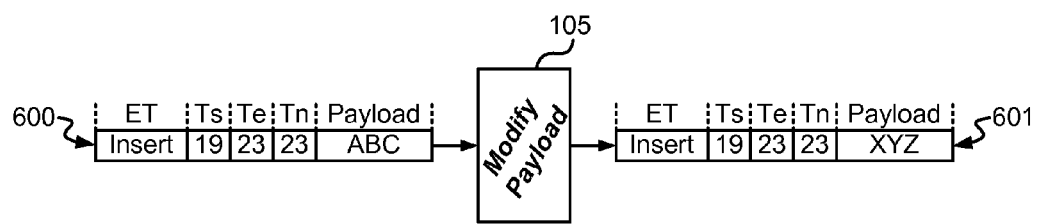
FIG. 6 illustrates an example of an operator modifying an insert event payload.

This is illustrated further in FIG. 6, where an input event 600 is input to an operator 105 that modifies the payload of the event and outputs an output event 601. In this example, the input event 600 has data comprising an event type (ET) of "insert", lifetime data comprising a start time (Ts) of 19, an end time (Te) of 23, a modified end time (Tn) of 23 and a payload of "ABC". The output event 601 has data comprising an event type (ET) of "insert", lifetime data comprising a Ts of 19, a Te of 23, a Tn of 23 and a payload of "XYZ". Therefore, in this example, the lifetime data matches, and it is determined that the input and output event are correlated.

Figure 7:
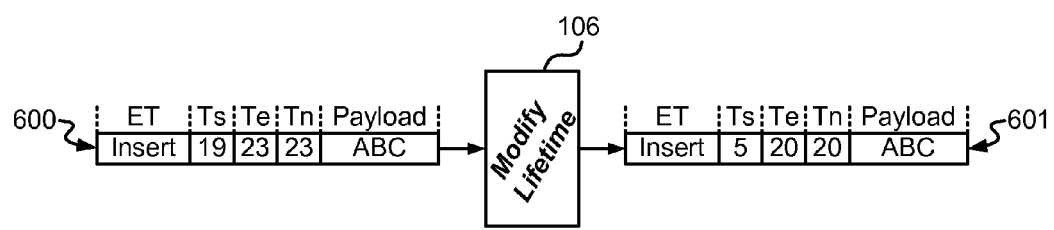
FIG. 7 illustrates an example of an operator modifying an insert event lifetime.

Another example is illustrated in FIG. 7, where the input event 600 is input to an operator 106 that modifies the lifetime of the event and outputs an output event 601. The input event 600 has a Ts of 19, a Te of 23, a Tn of 23 and a payload of "ABC", and the output event 601 as a Ts of 5, a Te of 20, a Tn of 20 and a payload of "ABC". Therefore, the lifetime data does not match, but the payloads to match and the input and output events are correlated.

Figure 8:
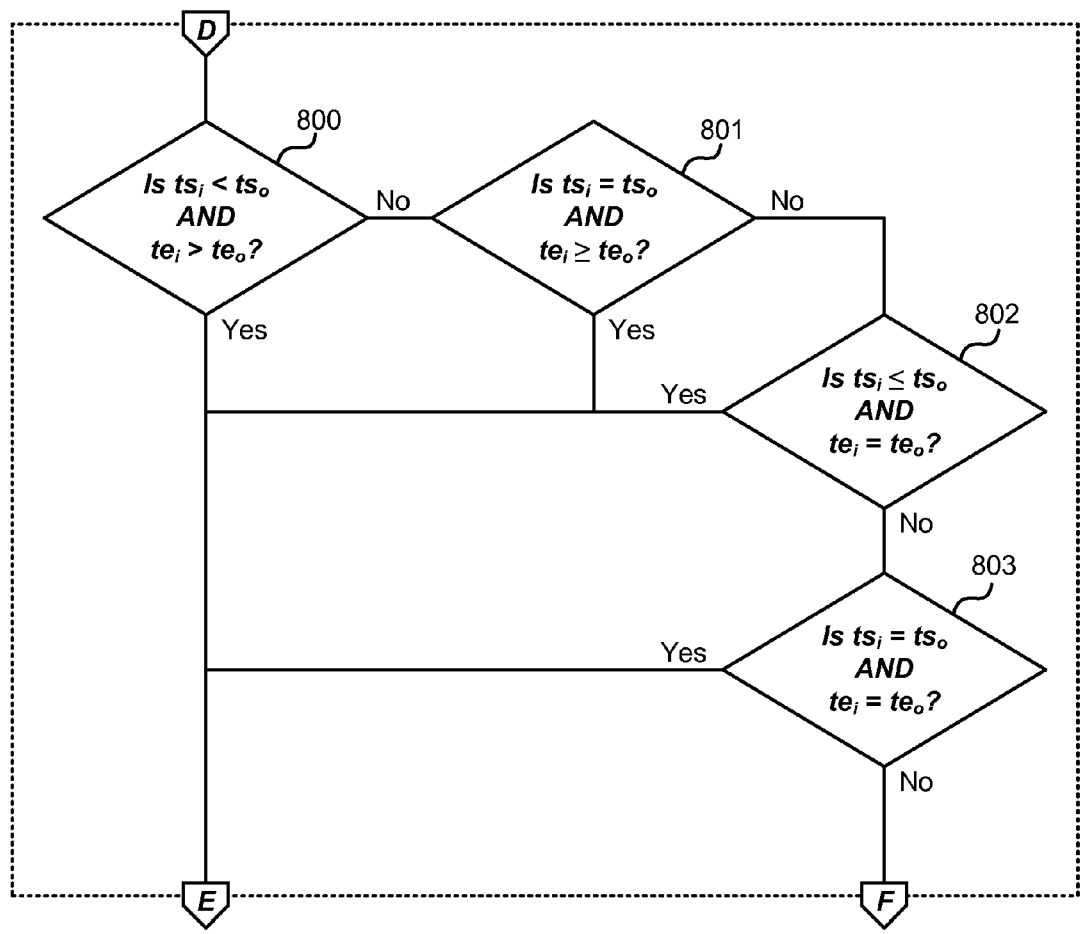
FIG. 8 illustrates a new event correlation algorithm.

Returning again to FIG. 4, if it is determined 401 that the operator is a new event operator, then a new event correlation algorithm 403 is used to determine whether or not the output event is correlated with the input event in question. A new event correlation algorithm is illustrated in FIG. 8. To determine whether an input event is correlated to the output in the case of an insert event and a new event operator, the lifetime data for the input and output events are compared to each other. In particular the start time of the input event ($Ts_i$) is compared to the start time of the output event ($Ts_o$), and the end time of the input event ($Te_i$) is compared to the end time of the output event ($Te_o$). As illustrated in FIG. 8, the input event is correlated to the output event if any of the following statements are true:

1). $Ts_i < Ts_o$ AND $Te_i > Te_o$ (800)
2). $Ts_i = Ts_o$ AND $Te_i \geq Te_o$ (801)
3). $Ts_i \leq Ts_o$ AND $Te_i = Te_o$ (802)
4). $Ts_i = Ts_o$ AND $Te_i = Te_o$ (803)

Figure 9:
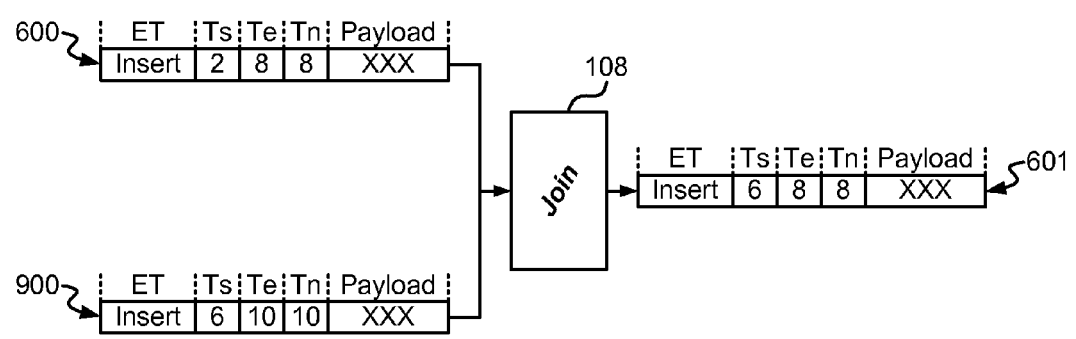
FIG. 9 illustrates an example of an operator joining insert events.
Figure 10:
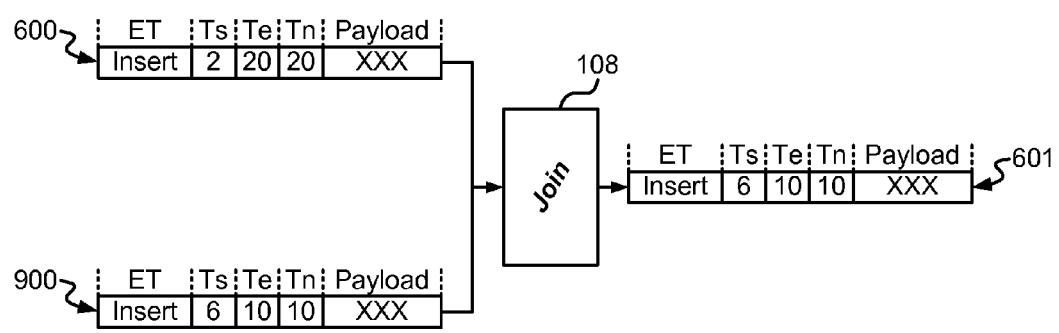
FIG. 10 illustrates a further example of an operator joining insert events.
Figure 11:
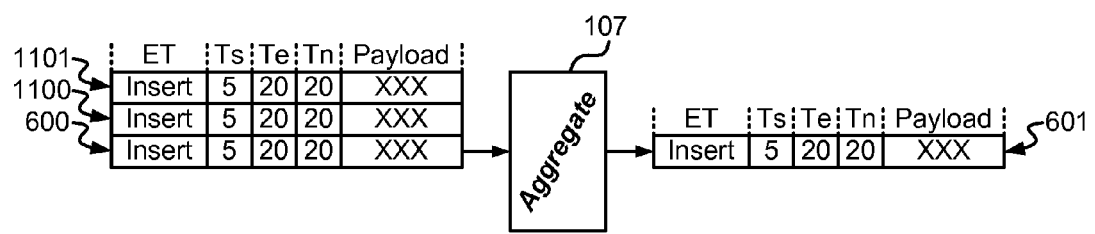
FIG. 11 illustrates an example of an operator aggregating insert events.

An example of this is shown in FIG. 9, in which a join operator 108 has two inputs, and receives a first input event 600, a second input event 900, and outputs an output event 601. The first input event 600 is correlated to the output event 601 as a result of statement 3), and the second input event 900 is correlated to the output event 601 as a result of statement 2). A further example of the same scenario is shown in FIG. 10, in which the first input event 600 is correlated to the output event 601 as a result of statement 1), and the second input event 900 is correlated to the output event 601 as a result of statement 4). A yet further example is shown in FIG. 11, in which an aggregate operator 107 receives multiple input events at an input (input event 600, 1100 and 1101) and the output event 601 is correlated to each input event 600, 1100 and 1101 by virtue of statement 4) above. The scenario in FIG. 11 can occur in the case that a number of sources send event data of the same type, all corresponding to the same time interval.

Returning again to FIG. 4, if it is determined 400 that the input event is of the update event type, then an update event correlation algorithm 404 is used to determine whether or not the output event is correlated to the input event in question. An update event correlation algorithm is illustrated in FIG. 12.

As mentioned, an update event is a correction of a previously inserted event. An output update event relates to an insert event or to another update event. In addition, an input update event ultimately derives from an insert event. In other words, for an operator receiving an input of an update event, there exists a preceding sequence of N events ending with an insert event (where the insert event is the 0th event, and the input update event in question is the Nth event).

Furthermore, an update event does not modify the start time of an event. However, an update event can modify the end time of an event, and can modify the payload of an event. Therefore, the input and output events are compared in terms of the lifetime data and the event type.

Figure 12:
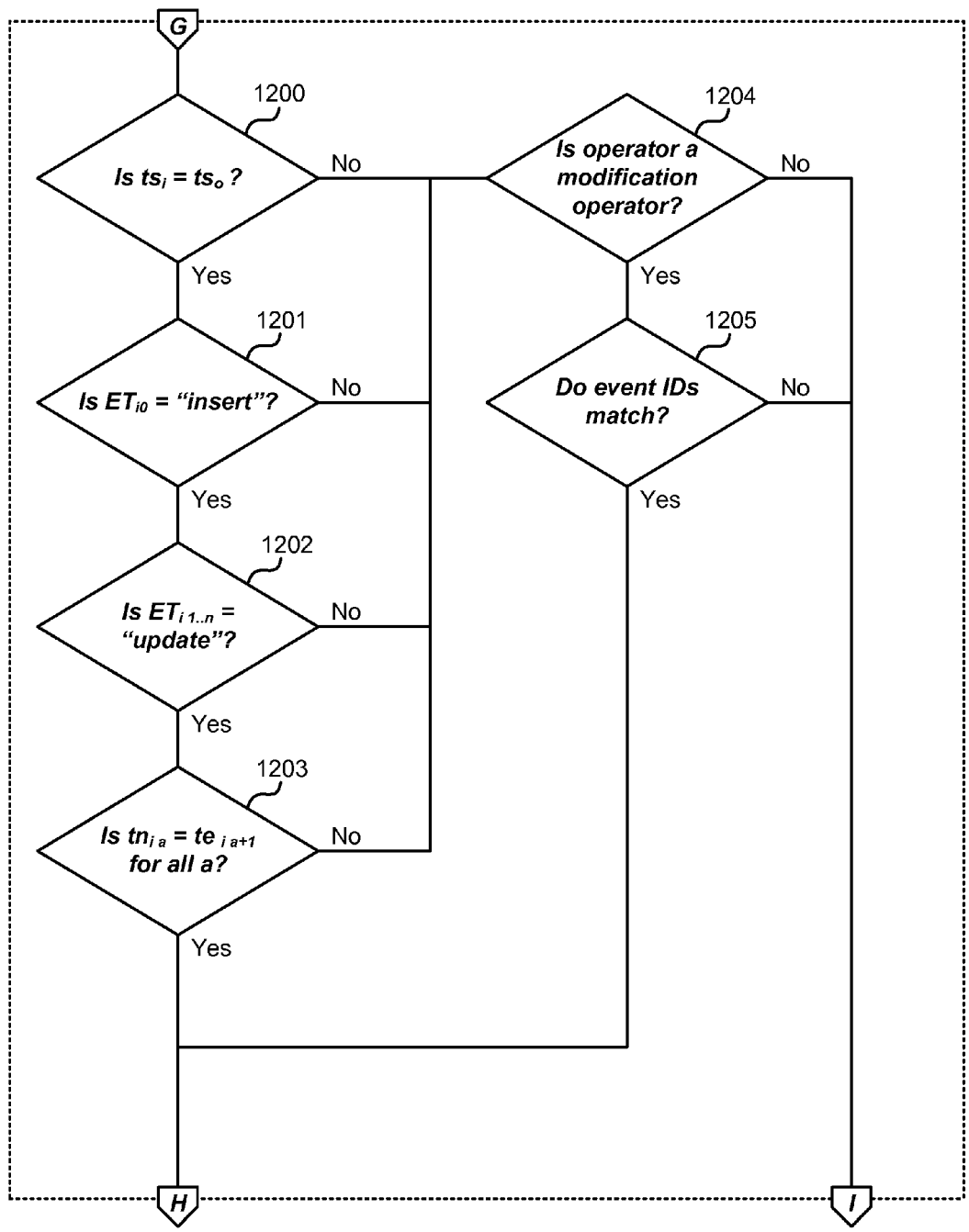
FIG. 12 illustrates an update event correlation algorithm.

With reference to FIG. 12, an input event is correlated to an output event if all of the following statements are true:

i). $Ts_i = Ts_o$ (1200)

ii). The sequence of events at this input of the operator go back to an insert event ($ET_{i0}$="insert") (1201)

iii). The sequence of events at this input of the operator after the insert event are update events ($ET_{i1...iN}$="update") (1202)

iv). The modified end time of each update event at this input of the operator equals the end time of the subsequent update event (i.e. $Tn_{ia} = Te_{ia+1}$ for a=1 to N) (1203)

If any of these statements are not true, then it is determined 1204 whether the operator is a modification operator. If not, then the input and output events are not correlated. If so, then it is determined 1205 whether the event identifiers match, if they are present. If so, then the input and output events are correlated, and if not, they are not correlated.

Figure 13:
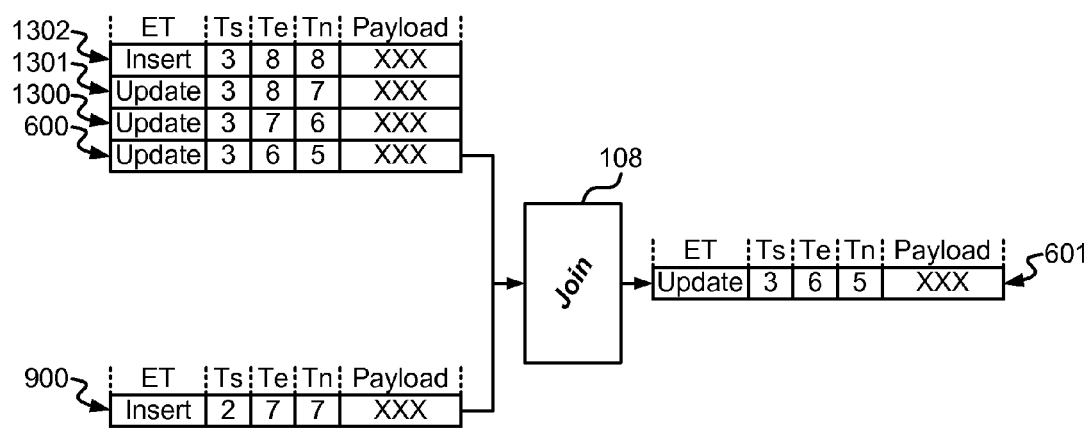
FIG. 13 illustrates an example of an operation performed on an update event.

An example of an update event is shown in FIG. 13. A first input of a join operator 108 receives a sequence of input events. The first input event 600 is an update event preceded by two previous update events 1300, 1301 and an insert event 1302. All the statements above are met in this example, and therefore the input event 600 is correlated with the output event 601. In the case of the second input event 900, this is an insert event, so the correlation is determined according to the new event correlation algorithm described above.

Figure 14:
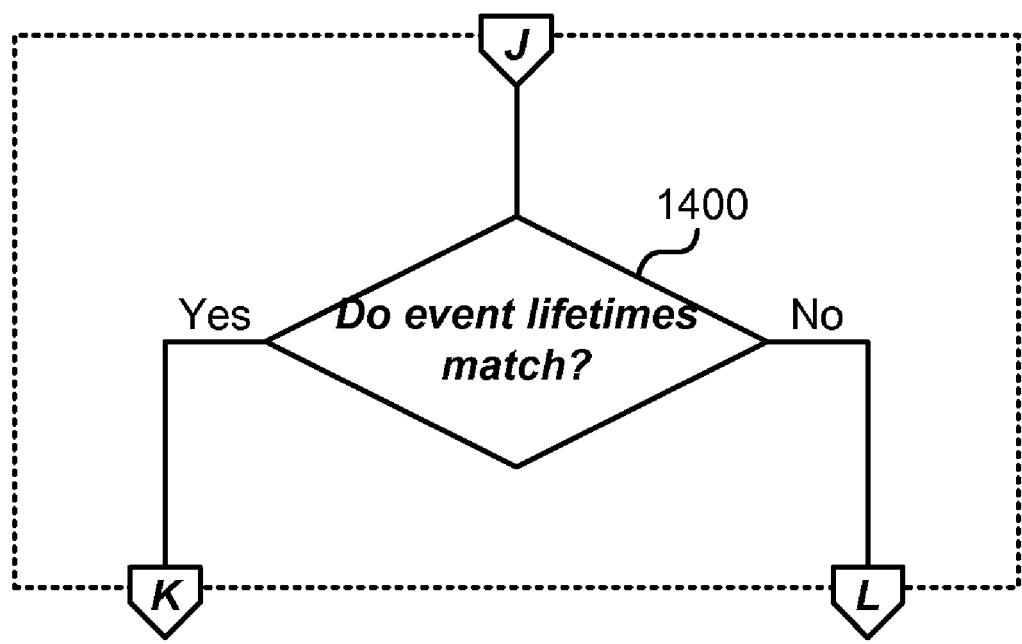
FIG. 14 illustrates a concurrent time increment event correlation algorithm.

Returning again to FIG. 4, if it is determined 400 that the input event is of the CTI event type, then a CTI event correlation algorithm 405 is used to determine whether or not the output event is correlated to the input event in question. A CTI event correlation algorithm is illustrated in FIG. 14.

A CTI event is not modified by operators in the complex event processing engine 100. This means that an output CTI event is unchanged from an input CTI event. Therefore lifetime data for the CTI event can be used to correlate the input and output events. As shown in FIG. 14, it is determined 1400 whether the lifetime data for the input event and output event match. If so, then the input and output events are correlated. If not, then the input and output events are not correlated.

Figure 15:
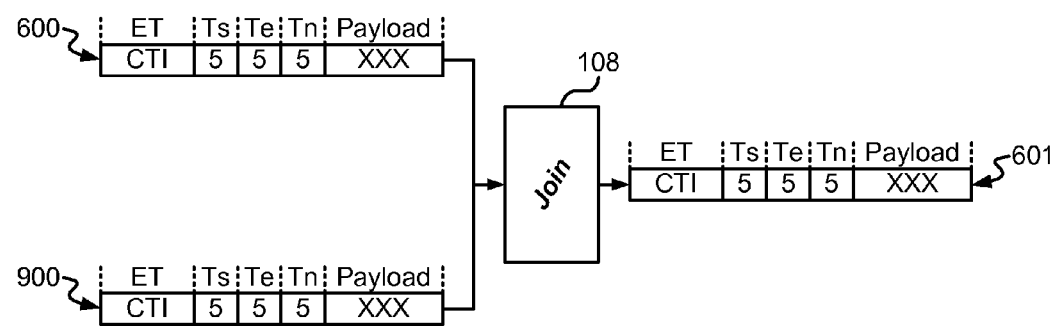
FIG. 15 illustrates an example of an operation performed on a concurrent time increment event.

An example is illustrated in FIG. 15, where a first input event 600 and a second input event 900, both of the CTI type, are input to a join operator 108, and an output event 601 is output. As the lifetime data matches, both of the input events are correlated to the output event 601.

As a result of performing the process in FIGS. 3, 4, 5, 8, 12 and 14, each of the events at each of the operators in the complex event processing engine 100 are analyzed, and each of the events having correlations to the derived event in question are added to the fault tree. Therefore, when the process ends, a complete fault tree showing the relationships between the derived event and the source events is produced.

As shown in FIG. 2, once the fault tree has been constructed, then it can be evaluated and the results utilized. One way to utilize the results of the root cause analysis is to feed-back the results obtained into the logging units 110, such that they can perform "selective logging". This can be achieved by performing root cause analysis to determine the fault tree for selected output events known to be of interest. The fault tree for these events can then be evaluated, and the results used to determine which events the logging units 110 log in the data store 111.

For example, root cause analysis can be used to determine the fault tree for certain exceptional events. The logging units 110 can then be arranged to log only those events which result in these exceptional events. Other events are not logged by the logging units 110. This therefore further reduces storage overheads in the complex event processing engine 100.

When the fault tree has been generated using the processes above, it can be displayed to the user of the complex event processing engine 100 in a user interface on a display. A debugger tool is arranged to receive the fault tree and display it to the user. The debugger tool can automatically generate filters and views of the events in the fault tree. This enables the user to visualize the events causing a certain derived event without having to manually analyze and slice through the data, thereby making the root cause analysis simpler for the user.

Figure 16:
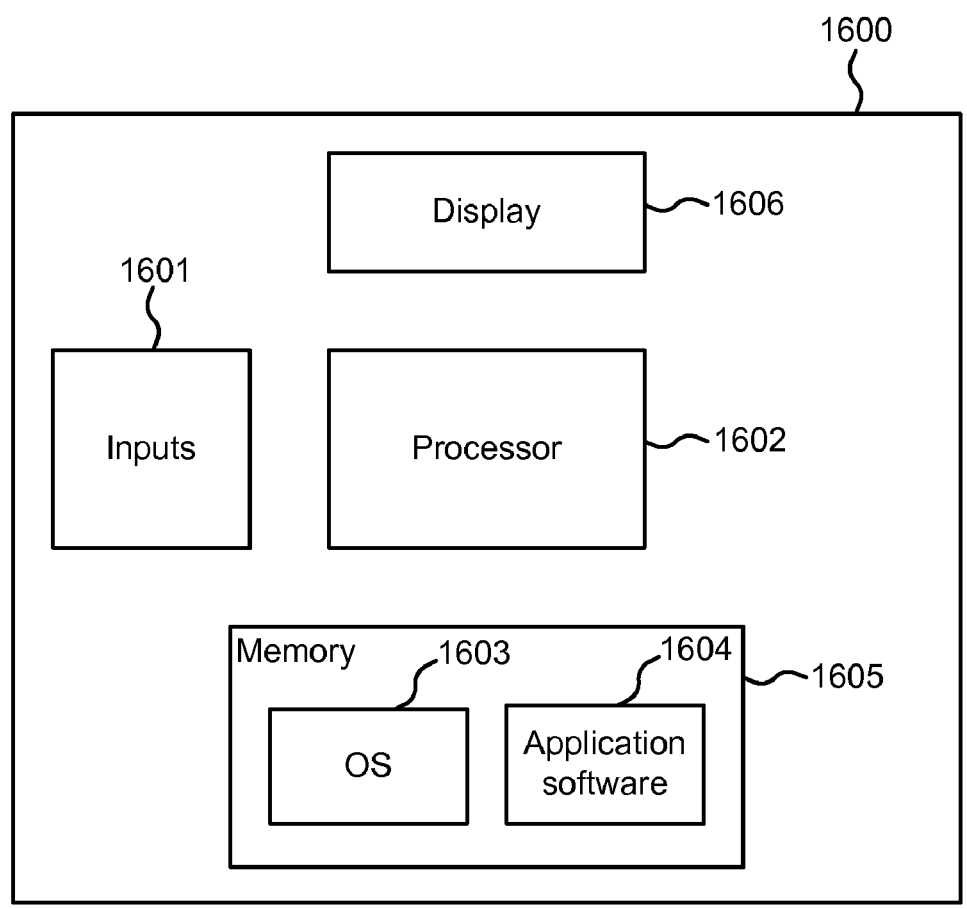
FIG. 16 illustrates an exemplary computing-based device in which embodiments of a complex event processor using root cause analysis can be implemented.

FIG. 16 illustrates various components of an exemplary computing-based device 1600 which can be implemented as any form of a computing and/or electronic device, and in which embodiments of root cause analysis for complex event processing can be implemented.

The computing-based device 1600 comprises one or more inputs 1601 which are of any suitable type for receiving user input, Internet Protocol (IP) input.

Computing-based device 1600 also comprises one or more processors 1602 which can be microprocessors, controllers or any other suitable type of processors for processing computing executable instructions to control the operation of the device in order to perform complex event processing and root cause analysis. Platform software comprising an operating system 1603 or any other suitable platform software can be provided at the computing-based device to enable application software 1604 to be executed on the device.

The computer executable instructions can be provided using any computer-readable media, such as memory 1605. The memory is of any suitable type such as random access memory (RAM), a disk storage device of any type such as a magnetic or optical storage device, a hard disk drive, or a CD, DVD or other disc drive. Flash memory, EPROM or EEPROM can also be used.

An output is also provided such as an audio and/or video output to a display system 1606 integral with or in communication with the computing-based device. The display system can provide a graphical user interface, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of root cause analysis executed on a processor, comprising:
    the processor selecting an output event in a complex event processing engine, the output event being output from an operator having an input event;
    reading an event type, payload data, and lifetime data for each of the input event and the output event from a data store in communication with the processor, the payload data including an event message that is modifiable by the operator; and
    the processor correlating the input event and the output event, based at least on the event type, on the payload data, and on a determination that the lifetime data for the input event and the output event are correlated.

2. A method according to claim 1, further comprising the step of, if the input event and the output event are correlated, adding the input event to a tree data structure, such that the input event is linked to the output event.

3. A method according to claim 1, wherein the lifetime data comprises a start time for the input event and the output event, and the step of correlating comprises comparing the start time of the input event with the start time of the output event.

4. A method according to claim 1, wherein the lifetime data comprises an end time for the input event and the output event, and the step of correlating comprises comparing the end time of the input event with the end time of the output event.

5. A method according to claim 1, further comprising the step of reading the payload data for the input event and the output event from the data store, and wherein the step of correlating comprises comparing the payload data for the output event and the input event.

6. A method according to claim 1, further comprising the step of reading an event identifier for the input event and the output event from the data store, and wherein the step of correlating comprises comparing the event identifier for the output event with the event identifier for the input event.

7. A method according to claim 1, wherein the step of correlating comprises selecting and executing one of a plurality of correlation algorithms in dependence on the event type.

8. A method according to claim 1, wherein the step of correlating comprises selecting and executing one of a plurality of correlation algorithms in dependence on an operator type for the operator.

9. A method according to claim 2, further comprising the step of using the tree data structure to control at least one subsequent operation of the complex event processing engine, such that the complex event processing engine only stores log data for events in the tree data structure.

10. A method according to claim 1, wherein the root cause analysis is a fault tree analysis.

11. A complex event processing engine, comprising:
    a log data store;
    at least one operator arranged to process an input event and output an output event; and
    at least one logging unit connected to the output of the at least one operator and arranged to store in the log data store an indicator of an event type, payload data, and lifetime data for each output event from the at least one operator, wherein the payload data is modifiable by the at least one operator, and wherein the complex event processing engine adds the input event to a tree structure based on a determination of whether the input event and the output event have matching lifetime data and whether the input event and the output event have matching payload data.

12. A complex event processing engine according to claim 11, wherein the lifetime data comprises a start time for the output event.

13. A complex event processing engine according to claim 11, wherein the lifetime data comprises an end time for the output event.

14. A complex event processing engine according to claim 11, wherein the lifetime data further comprises a modified end time for the output event.

15. A complex event processing engine according to claim 11, wherein the event type is at least one of: an insert event; an update event or a concurrent time increment event.

16. A complex event processing engine according to claim 11, wherein the operator is a modification operator arranged to modify the input event to generate the output event.

17. A complex event processing engine according to claim 11, wherein the operator is a new event operator arranged to create the output event using the input event.

18. A complex event processing engine according to claim 11, wherein the logging unit is further arranged to store for each output event at least one of: an identity of the operator; a log time; and an event identifier.

19. A complex event processing engine according to claim 11, wherein the logging unit is further arranged to determine whether to store data for the output event based on stored results of a root cause analysis previously performed on the complex event processing engine.

20. A method of root cause analysis executed on a processor, comprising:
- the processor selecting an output event in a complex event processing engine, the output event being output from an operator having an input event;
- reading an event type, payload data, and lifetime data for each of the input event and the output event from a data store in communication with the processor;
- the processor determining whether the input event and the output event are correlated, using the event type and the lifetime data, including determining that the lifetime data for the input event and the output event do not match and that the payload data for the input event and the output event match;
- adding the input event to a tree data structure such that the input event is linked to the output event, based on the determination that the input event and the output event are correlated; and
- displaying the tree in a user interface on a display.

* * * * *